United States Patent

Gutoehrlein et al.

Patent Number: 6,126,250
Date of Patent: Oct. 3, 2000

[54] BRAKING SYSTEM FOR A MOTOR VEHICLE

[75] Inventors: Bernd Gutoehrlein, Ludwigsburg, Germany; Thomas Meier, Saint-Quen Cedex, France

[73] Assignee: Robert Bosch GmbH, Stuttgart, Germany

[21] Appl. No.: 08/952,094

[22] PCT Filed: Feb. 28, 1996

[86] PCT No.: PCT/DE96/00330

§ 371 Date: Jan. 21, 1998

§ 102(e) Date: Jan. 21, 1998

[87] PCT Pub. No.: WO96/30242

PCT Pub. Date: Oct. 3, 1996

[30] Foreign Application Priority Data

Mar. 27, 1995 [DE] Germany ............................ 195 11 162

[51] Int. Cl.[7] .............................. B60T 8/88; B60T 8/74; B60T 8/62

[52] U.S. Cl. ....................... 303/122.03; 303/170; 303/186

[58] Field of Search ............................. 303/122, 122.03, 303/122.04, 122.05, 122.06, 122.07, 147, 170, 186

[56] References Cited

U.S. PATENT DOCUMENTS

| | | | |
|---|---|---|---|
| 3,995,912 | 12/1976 | McNinch, Jr. et al. | 303/21 |
| 4,134,621 | 1/1979 | Smedley et al. | 303/96 |
| 4,834,466 | 5/1989 | Arikawa | 303/92 |
| 5,172,959 | 12/1992 | Eickhoff et al. | 303/100 |
| 5,277,482 | 1/1994 | Beyer et al. | 303/92 |

FOREIGN PATENT DOCUMENTS

| | | | |
|---|---|---|---|
| WO 94/13517 | 6/1994 | Germany | 303/106 |
| 359227548 | 12/1984 | Japan | 303/122.05 |
| 404257756 | 9/1992 | Japan | 303/122.05 |
| 1 437 872 | 6/1976 | United Kingdom | 303/122.05 |
| 2 158 533 | 11/1985 | United Kingdom | 303/122.07 |

*Primary Examiner*—Robert J. Oberleitner
*Assistant Examiner*—Jeffrey Woller
*Attorney, Agent, or Firm*—Fulbright & Jaworski, LLP

[57] ABSTRACT

A brake system for a motor vehicle is proposed, in which at least the braking force distribution between the front and rear axles is influenced by an automatic electronic controller. In the event of a defect in a rotational speed sensor of a front wheel or a rear wheel, emergency operating measures are proposed, which maintain the functionality of the braking force distribution controller even after a defect has occurred.

7 Claims, 3 Drawing Sheets

BRAKING SYSTEM FOR A MOTOR VEHICLE

STATE OF THE ART

The invention pertains to a brake system for a motor vehicle according to the introductory clause of claim 1.

A brake system of this type is known from DE 4 12 388 A1 (U.S. Pat. No. 5,281,012). The brake system described in that document has an electronic control unit, which at least adjusts the braking force distribution between a front axle and a rear axle. The braking force distribution between the front axle and the rear axle should be as close as possible to the ideal braking force distribution with respect to deceleration and stability of the vehicle. This is achieved by means of an automatic controller, in which the difference between the slowest rear wheel and the fastest front wheel is compared with a predetermined difference value; the braking pressure is then adjusted in the rear axle brakes in such a way that the predetermined value is at least not exceeded. The electronic controller limits the pressure in the rear axle and prevents the rear axle wheels from locking before the front axle wheels. In the known automatic controller, it is assumed that the rotational speeds of the wheels of the vehicle are determined correctly. No measures for dealing with the occurrence of a defect are presented.

It is therefore the task of the invention to provide measures which ensure that the braking force distribution controller remains functional and that the rear wheels will not lock before the front wheels do even when there is a defect in one of the rotational speed sensors.

This is achieved by means of the characterizing features of claim 1.

Many different measures for testing the functionality of rotational speed sensors or for detecting defects in such sensors are known (see, for example, DE 34 18 235 C2).

ADVANTAGES OF THE INVENTION

By means of the procedure according to the invention, the advantageous effects of an electronic braking force distribution controller are obtained even when one of the rotational speed sensors fails.

It is especially advantageous that the advantageous effects are obtained when a rotational speed sensor at a front wheel fails and also when a rotational speed sensor at a rear wheel fails.

The functionality of the braking force distribution controller is maintained advantageously in such cases, and as a result the rear wheels are prevented from locking before the front wheels during a braking process. It is particularly advantageous, furthermore, that the stability of the vehicle is improved in vehicles with an overbraked rear axle.

By means of supplemental measures, the stability of the vehicle is improved when it is braked while traveling around a curve both in the event of the failure of a rotational speed sensor on a front wheel and also in the event of the failure of a rotational speed sensor on a rear wheel.

Additional advantages can be derived from the following description of exemplary embodiments and from the dependent claims.

DRAWING

The invention is explained in greater detail below on the basis of the embodiments illustrated in the drawing.

DESCRIPTION OF THE EXEMPLARY EMBODIMENTS

Figure 1:
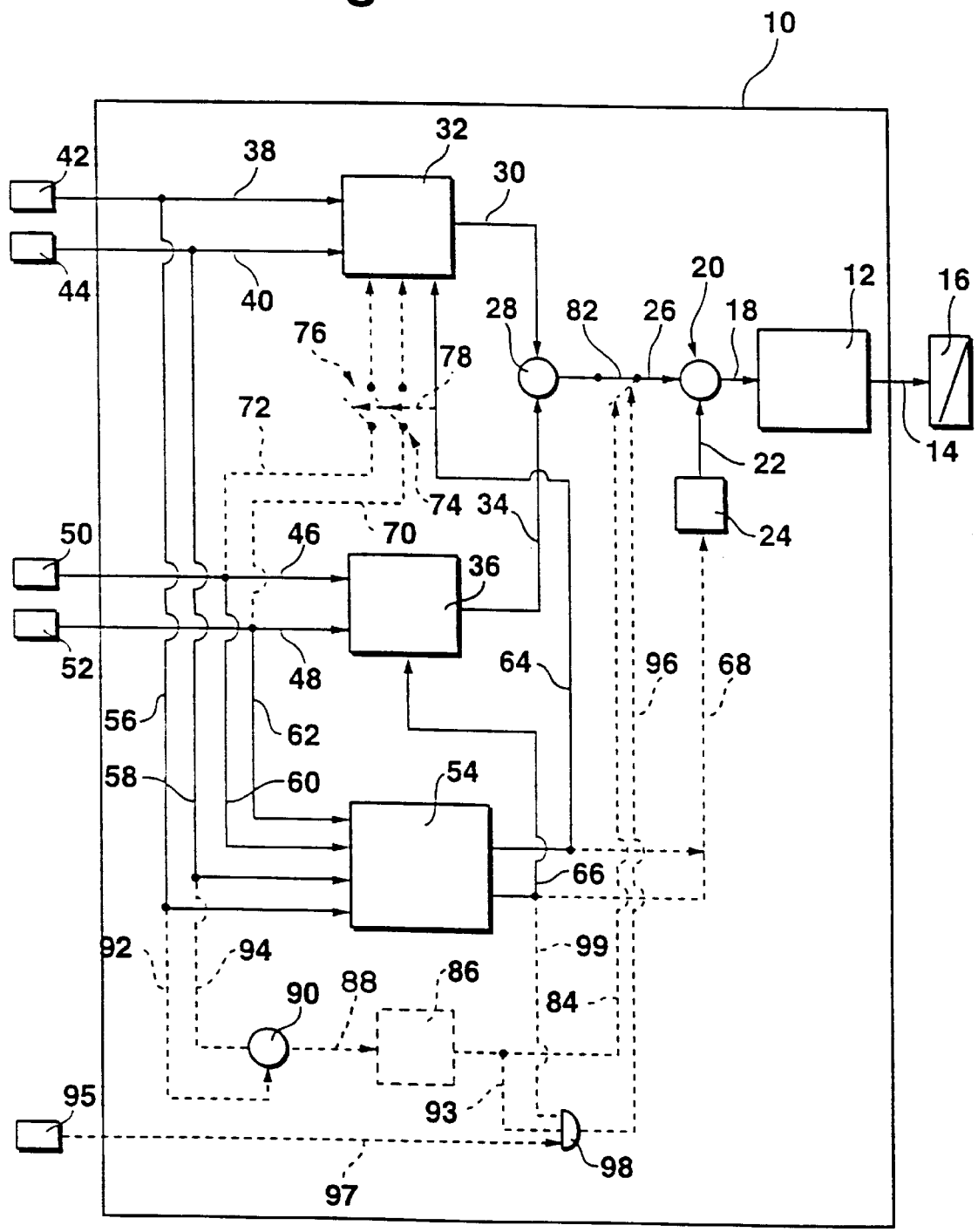
FIG. 1 shows an overall block circuit diagram of a brake system with electronic braking force distribution control, in which the measures according to the invention are used in the event of a defect.

FIG. 1 shows an electronic control unit 10, which consists of at least one microcomputer (not shown). With reference to the control of the braking force distribution between the front and rear axles, control unit 10 or the microcomputer here comprises essentially an appropriate automatic controller 12. Output line 14 of control unit 10, i,.e., of automatic controller 12, leads to valves 16, which affect the braking pressure in the rear wheel brakes. Over a line 18, a measure of the deviation between the nominal and the actual values of the difference between the fastest front wheel and the slowest rear wheel is transmitted to controller 12 from a comparison point 20. Over line 22, the nominal value is transmitted to comparison point 20 from a memory unit 24, and over line 26 the actual value is transmitted from a comparison point 28. So that the difference between the fastest front wheel and the slowest rear wheel can be found, a line 30 from a maximum value selection stage 32 and a line 34 from a minimum value selection stage 36 lead to comparison point 28. In the preferred exemplary embodiment of a two-axle vehicle, input lines 38, 40 lead from rotational speed sensors 42, 44, which detect the rotational speeds of the front wheels, to maximum value selection stage 32. Lines 46, 48 lead to minimum value selection stage 36 from rotational speed sensors 50, 52, which detect the rotational speeds of the rear wheels. In addition, a defect determination unit 54 is provided, to which lines 56, 58, 60, 62 from lines 38, 40, 48, 46 are connected. A first output line 64 of defect determination unit 54 leads to maximum value selection stage 32, whereas a second output line 66 leads to minimum value selection stage 36.

In the case of a multi-axle vehicle, the layout will be analogous to that described above for a two-axle vehicle.

In a preferred embodiment, a line 68 leads to memory element 24 from output lines 64, 66. In addition, in a preferred exemplary embodiment, a line 70 leads from line 46 and a line 72 leads from line 48 by way of switching elements 74, 76, respectively, to maximum value selection stage 32. Switching elements 74, 76 are actuated by way of line 78, which proceeds from output line 64 of defect determination unit 54.

In another preferred exemplary embodiment, furthermore, a switching element 82 is provided, which is inserted in line 26 between comparison points 20 and 28. This switching element cuts the connection between the comparison points and connects comparison point 20 to a line 84. This line proceeds from a threshold stage 86, to which a line 88 from a comparison point 90 is connected. A line 92 leads to comparison point 90 from line 56, and a line 94 leads to it from line 58. Switching element 82 is actuated by way of line 96. This is an output line of a logical AND gate 98, to which a line 99, starting from output line 66 of the defect determination unit, a line 97, proceeding from a brake light switch 95, and a line 93 branching off from line 84, are connected.

The elements shown are used for the control of the braking force distribution between the front and rear axles under normal driving conditions and in the event of the failure of a rotational speed sensor at a front and/or rear wheel. In addition, control unit 10 also comprises elements (not shown) for anti-lock protection, for drive slip control, for engine drag torque control, etc. The hydraulic part of the brake system, which is shown symbolically in FIG. 1 by valve 16, corresponds in the preferred exemplary embodiment to that described in the above-cited state of the art of DE 41 12 388 A1 (U.S. Pat. No. 5,281,012). The procedure according to the invention can be used advantageously not only in this type of hydraulic brake system but also in hydraulic systems of other designs as well as in pneumatic brake systems and in brake systems in which the brakes are applied by electric motors.

The measures shown in FIG. 1 increase the availability of the electronic braking force distribution control and make it possible to take advantage of this automatic control even when one of the speed sensors on a front and/or rear wheel fails. It is thus possible to omit hydraulic or pneumatic pressure reducers on the rear axle; and, because of the change in the distribution of the braking force, it is possible to achieve a more uniform thermal load in all the wheel brakes in the partial braking range even when a defect occurs. The rear wheels are effectively prevented from locking before the front wheels, and thus the stability of the vehicle is largely guaranteed even in the presence of a defect.

During operation in the absence of any defects, the rotational speeds of the front wheels, which are detected by speed sensors 42, 44, are sent to maximum value selection stage 32. There the maximum value of the two measurement values is determined; that is, the fastest front wheel is determined. At the same time, the rotational speeds of the rear wheels, which are detected by speed sensors 50, 52, are sent to minimum value selection stage 36. There the minimum value of the supplied measurement values is found; that is, the slowest rear wheel is determined. At comparison point 28, the difference between the maximum and the minimum value is found, and then the deviation between the actual value determined at comparison point 28 and a predetermined nominal value for the rotational speed difference, which is stored in memory element 24, is calculated at comparison point 20. As a function of the deviation supplied to it, automatic controller 12, which, in the preferred exemplary embodiment, is designed in accordance with the state of the art cited above, generates output signals for adjusting the rear axle brake pressure so as to bring the actual value into conformity with the nominal value.

In a preferred exemplary embodiment, the actual value is prevented from exceeding the predetermined nominal value by the limitation or reduction of the rear axle brake pressure. In other advantageous embodiments of the controller, the actual value is adjusted to match the nominal value by increases and decreases in the rear axle brake pressure.

Over the corresponding lines, the measurement values for the rotational speeds of the wheels are also sent to the defect determination unit. The defect determination unit evaluates the rotational speed signals of the wheels individually for the purpose of detecting possible defective states. If a defect is identified in a front wheel speed sensor, defect determination unit 54 transmits a corresponding signal over line 64. In the same way, it transmits a corresponding signal over line 66 if it identifies a defect in one of the rear wheel speed sensors.

If a defect occurs, the valve relay, over which the inlet and outlet valves of the wheel brakes are supplied with voltage, and the actuation of the return pump remain operative. In addition, the defective signal is excluded from the formation of the estimated vehicle velocity, which, under normal driving conditions, is formed on the basis of the rotational speed signals from all the wheels. In the case of defect in a front wheel speed sensor, only one front wheel speed signal is available for the formation of the reference value and the deviation value required for the braking force distribution controller. The defective wheel speed signal is also excluded from the maximum value selection, in that it is set equal to, for example, a minimum value. The defective wheel speed signal thus no longer has any effect on the reference formation or on the formation of the deviation for the braking force distribution. The correct front wheel speed signal is always assumed in this case to be the signal from the fastes front wheel. From this point on, the electronic braking force distribution controller functions in the same way as it does under normal driving conditions. When there is a defect in a front wheel speed sensor, furthermore, the difference is also formed between the fastest and the slowest rear wheel, upon which value the automatic control is then based. It is especially advantageous that, in the event of a defect, the sensitivity of the control is increased. This means that, in the event of a defect in a front wheel speed sensor, the controller responds even when the difference is smaller than that which occurs under normal driving conditions. For this purpose, the nominal value stored in memory element 24 is, in the event of a defect, switched to a smaller value. When braking on a curve, the degree of stability can differ depending on the location of the defective speed sensor (i.e., depending on whether the defective speed sensor is on the wheel on the inside of the curve or on the wheel on the outside of the curve); the stability can also differ on roads where the coefficients of friction on one side are different from those on the other side, depending on how these coefficients of friction are related. It is true that these differences in stability can impair the braking process. Nevertheless, the advantages that lateral guidance continues to be provided and that the rear wheels continue to be prevented from locking more than make up for this disadvantage.

Another improvement in stability in the event of a defective front wheel speed sensor is derived from the following supplemental measure. The slip calculation for the braking force distribution controller, that is, the formation of the difference between the fastest front wheel and the slowest rear wheel, is changed. For this purpose, in the event of a defect, the difference is calculated between the fastest wheel of all or an auxiliary reference resulting from the fastest of all the remaining wheels and the slowest rear wheel. This is sketched in FIG. 1 in that, in the event of a defect, the rotational speeds of rear wheel speed sensors 50, 52 are also sent to maximum value selection stage 32. This measures improves the stability during braking on a curve when the defective front wheel speed sensor is on the front wheel on the outside of the curve. Then the rear wheel on the out side of the curve can be the fastest wheel. The braking force distribution controller thus responds by holding or reducing the pressure at the rear axle at an earlier point, which improves the stability of braking on a curve.

In a corresponding manner, the braking force distribution control also remains operational in the event of a defect in a rear wheel speed sensor. In this case at least the locking of one of the rear wheels is avoided during a braking operation, and thus the stability of the braking process is essentially preserved. Here again, the defective speed sensor provides no information concerning the rotational speed of the wheel. Therefore, in the event of a defect in a rear wheel speed sensor, this speed signal is excluded from the reference and slip calculation.

The stability when braking on a curve can be improved by the use of the following advantageous measure. In addition to the control of the rear axle braking pressure on the basis between the fastest front wheel and the slowest rear wheel, it is provided, in the event of defect in a rear wheel speed sensor, that the braking force distribution function is also activated when a front wheel is slip ping in comparison with the other front wheel or in comparison with the reference velocity, that is, when the difference between the wheel speeds exceeds a predetermined value. This activation occurs even if little or no slip can be determined in the remaining rear wheel. Braking force distribution controller 12 is thus activated when a defect signal is received (line 99), when the brake pedal is actuated (brake light switch 95), and when the speed difference between the two front wheels exceeds the predetermined threshold value (line 93). This measure leads to improved stability when braking on a curve when the defective rear wheel speed sensor is on the inside of the curve.

In the simplest form of realization, controller 12 holds the rear axle braking pressure constant in this operating situation, as long as the difference between the front wheel speeds exceeds the threshold value specified in threshold stage 86. In another advantageous exemplary embodiment (see FIG. 1), the difference between the front wheel speeds is used as the actual value in place of the difference between the fastest front wheel and the slowest rear wheel, so that, as long as the difference between the front wheel speeds persists, the rear axle braking pressure is kept constant or is reduced.

In correspondence with the measure taken in the case of a front wheel speed sensor, the braking force distribution controller is also designed with greater sensitivity in the event of a defect of a rear wheel speed sensor in that the experimentally determined nominal difference value is revised to a smaller value.

Figure 2:
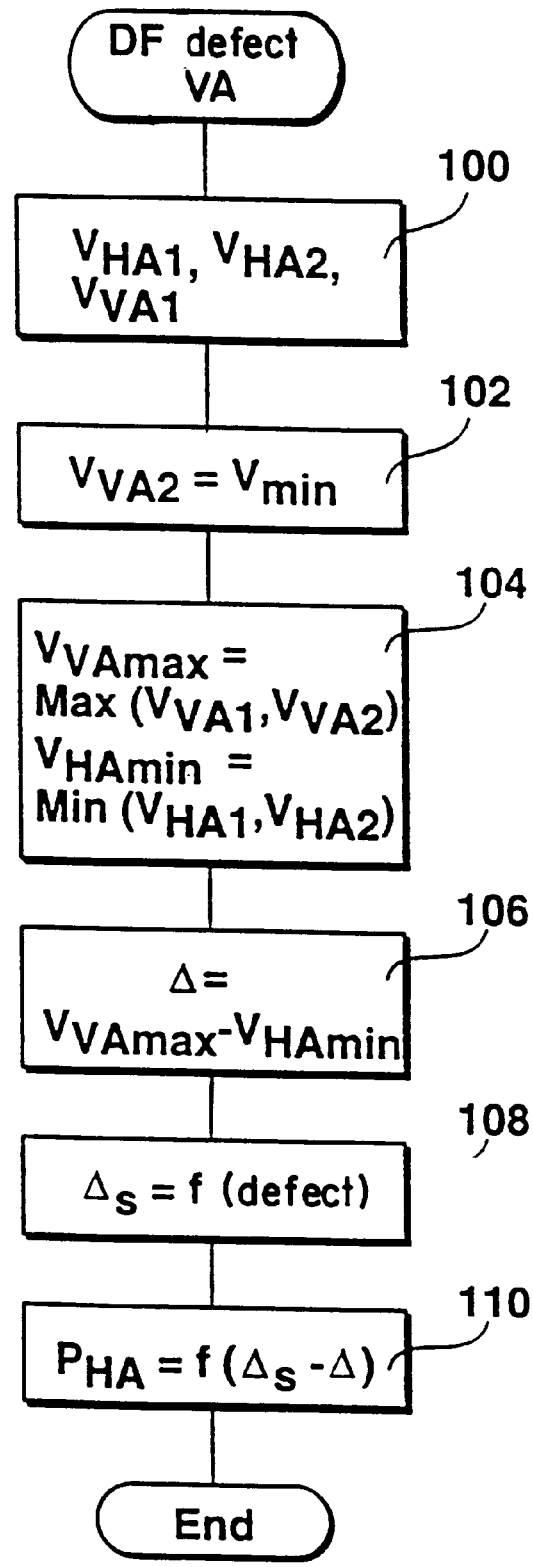
FIGS. 2 and 3 show flow charts, which sketch the procedure according to the invention which is implemented when a rotational speed sensor fails at a front wheel and at a rear wheel, respectively.
Figure 3:
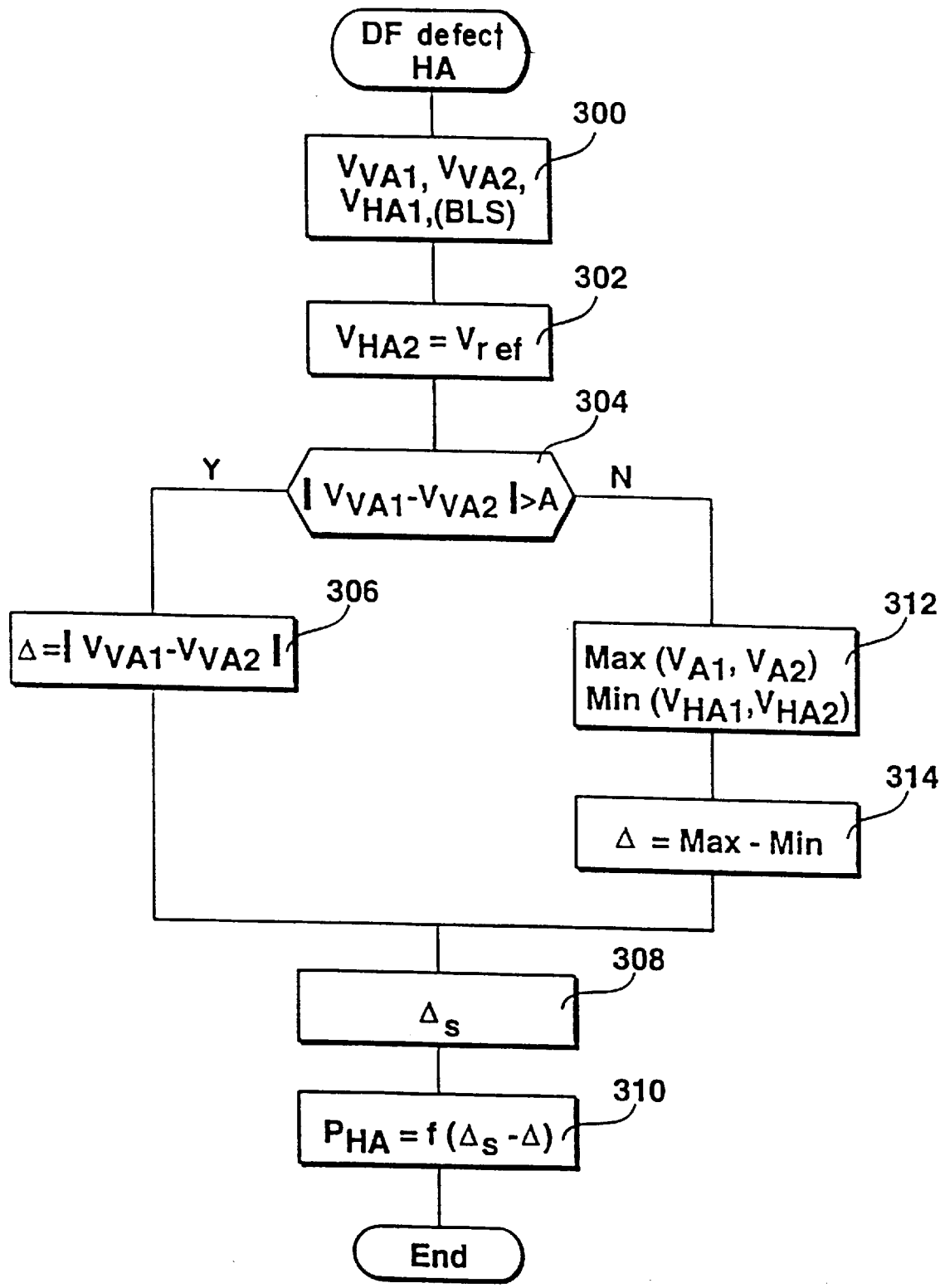

The measures described above are sketched in the form of flow charts in FIGS. 2 and 3. These flow charts represent the implementation of the procedure according to the invention as a computer program. The subprogram shown in FIG. 2 is started when a defect occurs in a speed sensor of a front wheel; the subprogram shown in FIG. 3 is started when a defect occurs in a speed sensor of a rear wheel.

As soon as the subprogram illustrated in FIG. 2 starts, the two wheel speeds of the rear wheel speed sensors $V_{VA1}$ and $V_{HA2}$ and the rotational speed sensor signal of the functional front wheel speed sensor (here, for example, $V_{VA1}$; $V_{VA2}$ is assumed to be defective) are accepted as input in the first step 100. In the following step 102, the front wheel speed signal of the speed sensor $V_{VA2}$, which has been identified as defective, is set to a mini mum value $V_{min}$. In the next step 104, the maximum value $V_{VAmax}$ is determined on the basis of the two front wheel speed signals, and the minimum value $V_{HAmin}$ is determined on the basis of the two rear wheel speed signals. As mentioned above, in another advantageous exemplary embodiment, all of the wheel speed signals, especially the functional wheel speed signals, are used to form the maximum value.

In the following step 106, the difference between the maximum value and the minimum value is formed. Then, in an advantageous exemplary embodiment, the nominal difference value $\Delta_S$ to be used in the case of a defect is read out in question step 108, and in the following step 110 the rear axle braking pressure is adjusted as a function of the difference between the nominal and actual difference value. After step 110, the subprogram terminates and is repeated at the specified time.

After the subprogram according to FIG. 3 has started in the presence of a defect in a rear wheel speed sensor, the front wheel speeds $V_{VA1}$ and $V_{VA2}$ and the correct rear wheel speed signal (here, $V_{HA1}$; $V_{HA2}$ is assumed to be defective) are accepted as input in the first step 300. In addition, in a preferred exemplary embodiment, the signal status BLS of the brake pedal switch is read in as input. Then, in step 302, the reference speed signal $V_{ref}$ formed from the correct signal values or a signal value derived from it is taken as the second rear wheel speed signal $V_{HA2}$. As an alternative, this speed signal can be equated to a driving speed signal determined in some other way or to a maximum value. In the following question step 304, the absolute value of the difference between the speeds of the two front wheels is compared with a predetermined threshold value A. If the absolute value of the difference exceeds this threshold value and simultaneously the brake light switch signalizes a brake actuation, in step 306 the difference value is set to the absolute value of the difference between the speeds of the two front wheels. Then, in step 308, the nominal difference value possibly under consideration of the defect situation and the fact that the slip between the two front wheels is available as an actual value, is read out; and in the next step 310, the rear axle brake pressure is adjusted as a function of the difference between the nominal difference and the actual difference. After step 310, the subprogram terminates and is repeated at the specified time.

If the program found in step 304 that the difference between the two front wheels does not exceed threshold value A, then in step 312 the maximum and minimum values are formed from the front wheel speed signals and the rear wheel speed signals. In the following step 304, the actual value is then calculated from the difference between the maximum and minimum values, which is then adjusted in accordance with steps 308 and 310.

The implementation of step 306 has been found to be suitable in an exemplary embodiment. In other exemplary embodiments, the emergency procedure in the event of a defect in a rear wheel speed sensor is carried out only on the basis of steps 312 and 314.

In the case of a two-axle vehicle, the procedure according to the invention pertains only to individual defects on one axle. If double defects occur, that is, if both speed sensors fail, other measures must be taken.

If defects are recognized at both a front wheel and a rear wheel, the measures according to the invention are implemented in combination (without step 306).

The procedure according to the invention is applicable in an advantageous manner to all braking force distribution controllers which operate on the basis of signals representing the rotational speeds of the wheels.

We claim:

1. A brake system for a motor vehicle having front and rear axles each supporting at least one wheel, said system comprising:
   an automatic braking force distribution controller controlling the distribution of braking force between the front and the rear axles on the basis of a difference value based on a rotational speed signal of the front and on a rotational speed signal of the rear wheels in accordance with a nominal difference value,
   a defect determination unit determining defects involving the rotational speed signals of the wheels of the motor vehicle,
   the automatic braking force distribution controller, in the event of a determination of a defect in a rotational speed signal of a front wheel and/or of a rear wheel, operating within the scope of an emergency operating procedure under exclusion of the defective initiating an emergency operating procedure under exclusion of the defective defective speed signal, in the emergency operating procedure the automatic braking force distribution controller controls the distribution of braking force between the front and the rear axles on the basis of a difference value based on a non-defective rotational speed signal of the front and on a non-defective rotational speed signal of the rear wheels in accordance with the nominal difference, with the sensitivity of the automatic braking force distribution controller increased by adjustment of said nominal difference to a smaller value.

2. A brake system according to claim 1, wherein, to control the braking force distribution between the front and rear axles, a difference between the fastest front wheel and the slowest rear wheel is formed and compared with a predetermined nominal value for the adjustment of the rear axle braking pressure.

3. A system according to claim 2, wherein in the event of a defect in a rear wheel speed signal, the difference between the rotational speeds of the two front wheels is used as the actual difference value.

4. A system according to claim 1, wherein in the event of a defect in one of the front wheel speed signals, the speed signal of the other front wheel is identified as the fastest front wheel.

5. A system according to claim 1 wherein the speed signals are generated by sensors associated with the wheels, and, in the event of a defective front wheel speed sensor, the fastest of all the other wheels is used for automatic control.

6. A system according to claim 1, wherein the speed signals are derived from sensors associated with the wheels, and in the event of a defect in a rear wheel rotational speed sensor, a driving speed reference signal or a driving speed signal is taken as a substitute for the defective speed signal.

7. A system according to claim 1, wherein in the event of a defect in a rear wheel speed signal, the electronic braking force distribution controller is activated when the difference between the rotational speeds of the front wheels exceeds a threshold value during the braking process.

* * * * *